United States Patent [19]

James et al.

[11] 4,149,238
[45] Apr. 10, 1979

[54] COMPUTER INTERFACE

[75] Inventors: James A. James, Rosemount; Derald A. Pedersen, Burnsville, both of Minn.

[73] Assignee: Control Data Corporation, Minneapolis, Minn.

[21] Appl. No.: 829,176

[22] Filed: Aug. 30, 1977

[51] Int. Cl.² .................................................. G06F 3/04
[52] U.S. Cl. ............................................................ 364/200
[58] Field of Search ... 364/200 MS File, 900 MS File

[56] References Cited

U.S. PATENT DOCUMENTS

| | | | |
|---|---|---|---|
| 3,710,324 | 1/1973 | Cohen et al. | 364/200 |
| 3,810,114 | 5/1974 | Yamada et al. | 364/200 |
| 3,886,524 | 5/1975 | Appelt | 364/200 |
| 3,997,896 | 12/1976 | Cassarino, Jr. et al. | 364/200 |
| 4,016,541 | 4/1977 | Delagi et al. | 364/200 |
| 4,050,097 | 9/1977 | Miu et al. | 364/200 |

*Primary Examiner*—Gareth D. Shaw
*Assistant Examiner*—Thomas M. Heckler
*Attorney, Agent, or Firm*—Robert M. Angus

[57] ABSTRACT

A computer interface for interconnecting a plurality of computer modules in a multiplex manner to emulate a computer configuration includes transmitters and receivers associated with each master and slave module, together with logic means whereby the master module is permitted to initiate computer operations with acknowledgement from the slave to insure proper data speeds. Conflicts are resolved between master modules.

8 Claims, 5 Drawing Figures

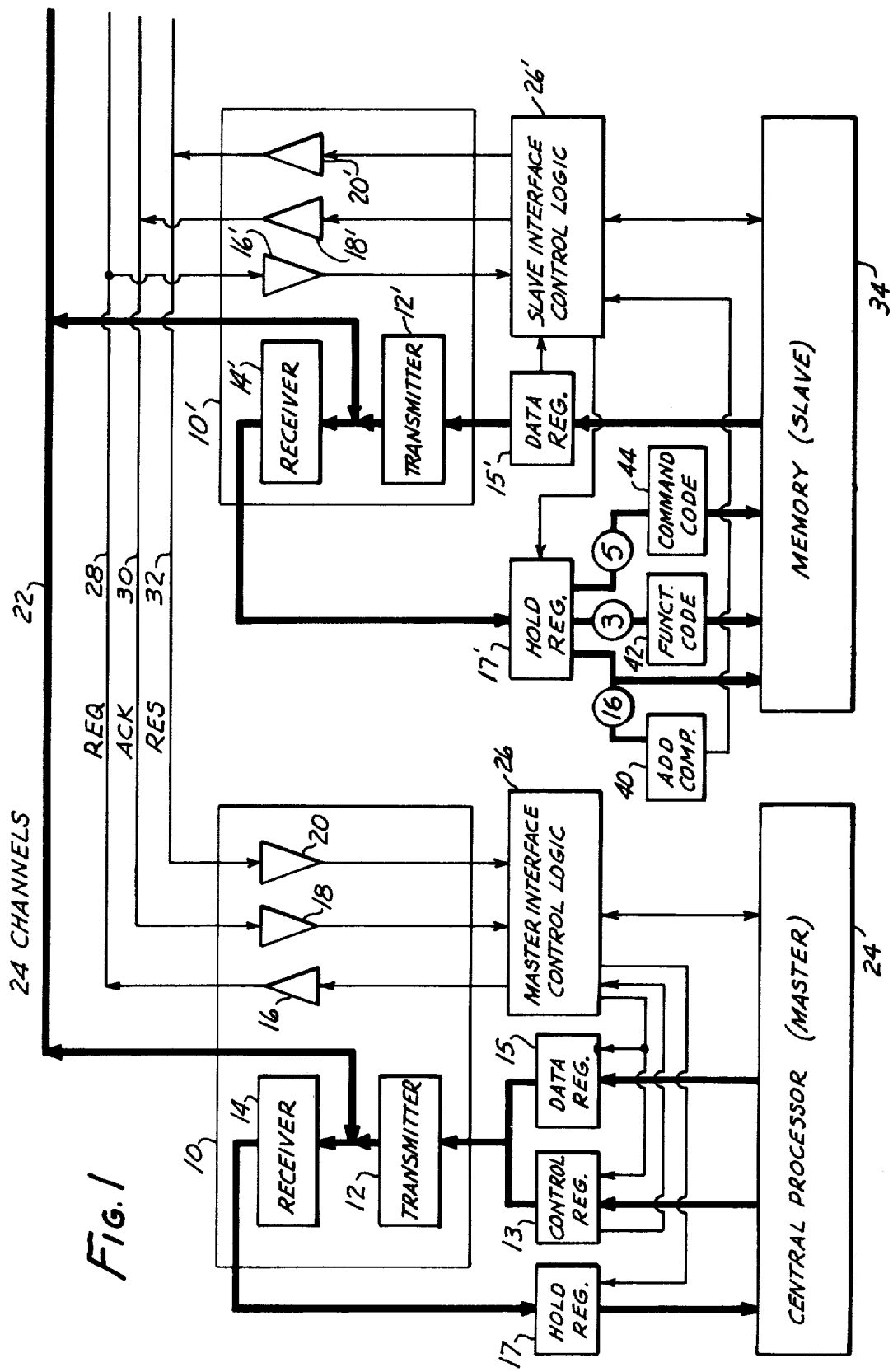

COMPUTER INTERFACE

This invention relates to computer systems, and particularly to computer system configurations consisting of a family of plugable modules, chassis and support equipment. The invention is particularly useful in connection with computer system configurations for emulating a wide range of general-purpose computers.

As the state of the computer art developed, providing a wide range of general-purpose computers, a growing need has likewise developed for a computer system configuration capable of receiving plugable modules to configure a general-purpose computer capable of emulating other general-purpose computers. Such emulating computer systems are thus capable of operating utilizing software originally designed for the computer being emulated. The present invention is concerned with a multiplexing structure capable of receiving plugable modules which, when interconnected via the multiplexing system, forms a computer system capable of emulating a specific computer.

A typical computer configuration consists of a general processor and/or input/output processor. The general processor includes all micro-program control, arithmetic units, registers and interfaces. In addition, the general processor may be supported by a processor support module which includes elements such as additional micro-memory, real-time clocks, add-on memory, multiplex interfaces, and event (interrupt) logic to compliment the functions of the general processor. Additionally, multiple channel processors may be utilized to expand the arithmetic and data capabilities or to cascade the processing functions. If required in a particular configuration, an extended arithmetic unit an/or an input/output processor may also be utilized. An extended arithmetic unit may include high speed floating point operations and special arithmetic instructions. The input/output processor may be a micro-programmable controller to control the input and output of the computer and to emulate basic computers.

The present invention is concerned wth a multiplexed communication channel for receiving computer modules to permit emulation of a computer system.

One feature of the present invention includes the provision of permitting memory modules to be interfaced directly to the general processor or input/output processor by way of the multiplex channel for emulating computer systems without the necessity of memory management functions such as paging, memory protect or parity check features. Furthermore, by utilizing multiple multiplex techniques, the general processor may overlap instruction access and operand access to enhance execution time.

Another feature of the present invention resides in the provision of a communications channel for interconnecting modules to permit horizontal and vertical expansion of the modules thereby permitting expanded arithmetic capabilities and cascaded processing functions.

Utilizing the present invention, communications between the functional modules may be accomplished through the use of two or more identical multiplex units. The high speed parallel multiplexing units are the primary data paths between the procssor modules, memory modules and input/output modules. By way of example, one multiplex unit may be utilized for instruction fetching and another for input/output traffic and instruction operand references. Control of specific operations on a multiplex unit (such as read, write, status or functioning) is specified by the data, along with the channel address for the input/output operations or memory function for memory operations.

One problem associated with the emulation of computer systems resides in the fact that various modules may be operable at various data speeds. Accordingly, another feature of the present invention resides in the provision of a communication channel having an acknowledgement or answer back provision to insure that data is properly received, regardless of data speed. Hence, the general processor will, through use of the acknowledgement or answer back feature, be adjusted to the data rate of the slave module.

Another feature of the present invention resides in the provision of a computer communication interface channel, plug compatible to a variety of computer modules, which permits emulation of a variety of computer system configurations, depending solely upon the modules connected to the interface channel.

The above and other features of this invention will be more fully understood from the following detailed description and the accompanying drawings, in which:

FIGS. 1 and 1A, taken together, illustrate is a block circuit diagram of a communication and multiplex apparatus in accordance with the presently preferred embodiment of the present invention;

Figure 1A:
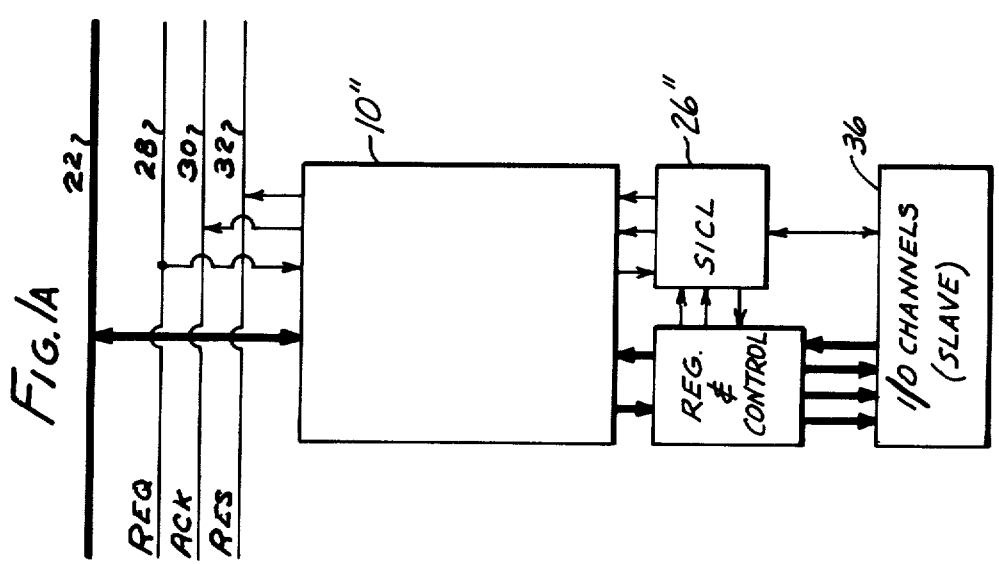

With reference to the drawings, and particularly to FIGS. 1 and 1A taken together in edge-matched relationship, there is illustrated a communication and multiplexing system in accordance with the presently preferred embodiment of the present invention. The apparatus comprises a communication interface module 10 having a data transmitter 12, a data receiver 14, and amplifiers (e.g. drivers and/or data receivers 16, 18 and 20). Transmitter 12 and receiver 14 are each capable of operating on 24 binary channels of communication channel 22. Transmitter 12 receives an input from control register 13 and data register 15, which in turn receive control information and data information from central processor 24 of the master station, and provides an output to the channels 22. Receiver 14 receives an input from the channels 22 and provides an output to hold register 17 for output to central processor 24. A master interface control logic 26 is provided with outputs to registers 13, 15 and 17. Logic 26 is also connected for intercommunication with processor 24. One output from logic 26 is provided through amplifier 16 to request channel 28 which is a single bit request line capable of carrying request pulse signals. Channel 30, which is a single bit acknowledgement channel, provides an input to amplifier 18 for inputting acknowledgement pulse signals to logic 26. Channel 32, which is a single bit resume channel, provides an input to amplifier 20 for inputting resume pulse signals to logic 26.

Channels 22, 28, 30 and 32 are also connected to the slave communication interface modules 10' and 10" which are essentially identical. Slave communication interface 10' includes a receiver 14' and a transmitter 12' connected to transmit and receive information from the channels 22 for interface to the slave unit which may, for example, comprise a memory 34 or suitable input-/output channels 36. Hold register 17' receives received data from receiver 14' and data register 15' provides data to transmitter 12' from the slave unit 34 or 36. Amplifier 16' is connected to channel 28 to receive request pulse signals therefrom for delivery to the slave interface control logic 26'. Amplifiers 18' and 20' transmit acknowledge and resume pulse signals from the slave interface logic control 26 to the channels 30 and 32, respectively.

Hold register 17' provides a 16-bit output to address comparator 40 and to the slave unit 34 or 36. Hold register 17' also provides a 3-bit output to function code unit 42 and a 5-bit output to command code unit 44. The outputs of units 42 and 44 are also connected to slave unit 34 or 36.

Figure 2:
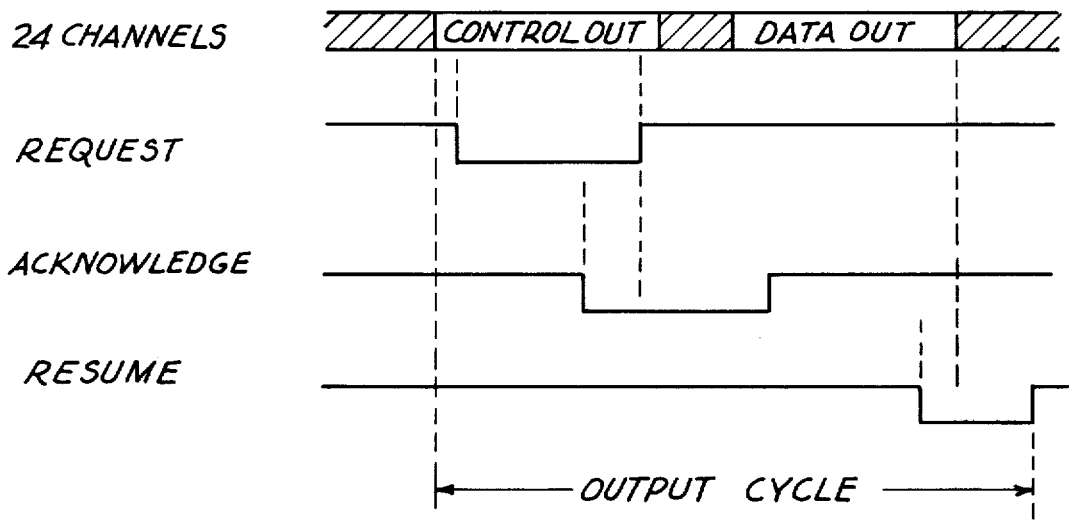
FIG. 2 is a diagram illustrating the principles of operation of the apparatus illustrated in FIGS. 1 and 1A in connection with transmitting data from a master unit to a slave unit.

With reference to FIG. 2, the operation of the apparatus for delivery of data to a slave unit from the master 24 may be explained. The master or central processor 24 provides a plurality (e.g. 24) of control bits to register 13 and a plurality (e.g. 16) data bits to data register 15. The control signal may, for example, comprise 24 bits of control information for insertion on each of the 24 channels comprising the communication channel 22. Typically, the control signal includes a 16-bit address of the slave unit to be operated, a 3-bit function code (which may, for example, define the type of operation such as data or status operation, input or output operation and memory or input/output operation), and a 5-bit command code (which may, for example, indicate the particular input/output channel in the case of I/O operations or indicate the type of memory condition — such as protected memory condition, etc. — in the case of memory operation). The data code comprises a 16-bit data word, operated in the manner dictated by the function code and/or command code of the control word. When the unit is conditioned to transmit information to a slave unit, central processor inserts the control word and data word into registers 13 and 15 and gates the master interface control logic to provide an enable signal to control register 13 to forward the control word to transmitter 12 to initiate operation of the transmitter. The control word is thus placed onto the 24-bit channels 22. At the same time or shortly thereafter, request line 28 is enabled via the master interface control logic 26 to provide a request pulse on channel 28.

The control word is received by all receivers 14'. Receipt of the request pulse via channel 28 by the slave interface control logics 26' enables hold register 17' in all slave units to store the control word. The control word includes the address (or channel identifier, in the case of I/O channels) of the slave unit of which data is intended. This address is compared by the address comparators 40, and that comparator which recognizes the address forwards an enable signal to the slave interface control logic 26' to cause the function code and command codes to be forwarded to the slave unit, such as the memory or the I/O channels, via units 42 and 44. The slave interface control logic 26' or 26" also responds to the enable signal from comparator 40 to place an acknowledge pulse signal on line 30. The acknowledge signal is received via amplifier 18 by the master interface control logic 26 which recognizes the acknowledge signal as indicative of the fact that the slave received the control information. The master interface control logic responds to the acknowledge signal to terminate the request signal on channel 28 and to terminate the enable signal to control register 13, thereby removing the control word from channel 22. Also, master interface control logic 26 enables data register 15 to cause the data word to be inserted onto channel 22 via transmitter 12. The data word is received by the receivers 14' and stored in the hold register 17'. The operated slave unit also generates, in its slave interface control logic, a resume signal which is impressed on channel 32. The resume signal also enables the slave unit 34 or 36 to receive the data word from hold register 17'. The resume pulse signal continues for a period until removal of the data word by the master unit transmitter 12. Removal of the resume pulse signal by slave interface control logic 26' indicates to the master interface control logic that the data word has been successfully received by the slave unit.

The slave interface logic controls 26' of each slave unit respond only to a request pulse signal on line 28 when appearing simultaneously with a control word on channel 22 containing the address of the particular slave unit. Therefore, when the addressed slave unit responds with an acknowledge pulse signal, thereby terminating the request pulse signal, the slave interface control logic 26' of the responding slave unit is conditioned to provide the additional enable signals to receive the data word (or transmit a data word as hereinafter explained), whereas the other, non-responding slave units remain dormant until another request pulse signal is generated by the master unit. Hence, the generation of a data word onto channel 22 will not be responded to by any of the other slave units, as they remain dormant until the next request signal appears, during the next cycle.

Figure 3:
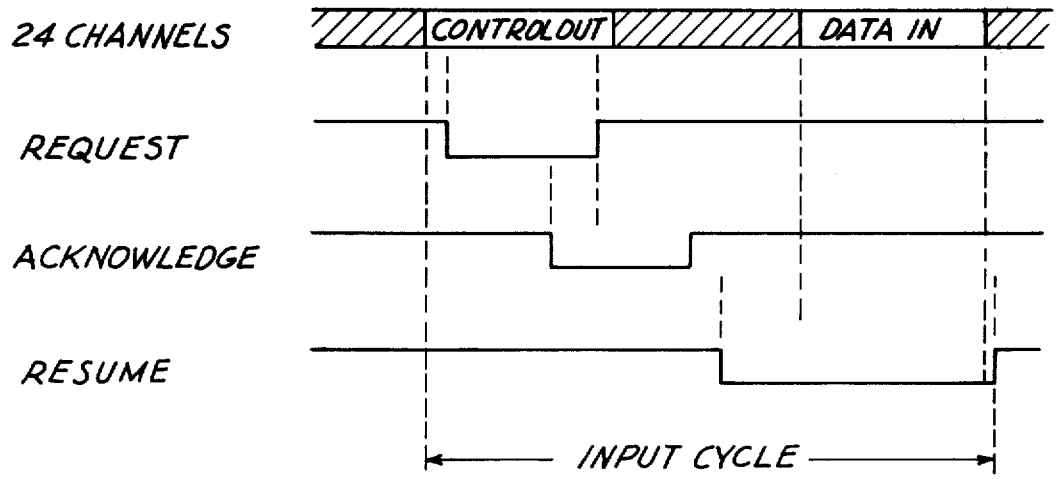
FIG. 3 is a diagram illustrating the principles of operation of the apparatus illustrated in FIGS. 1 and 1A in connection with transmitting data from a slave unit to a master unit.

With reference to FIG. 3, when a slave unit is prepared to send information to the master unit, such can only be accomplished upon request from the master unit. Thus, upon such occurance, the master unit causes a request pulse signal to be imposed on the request line 28 via the master interface control logic 26 as heretofore explained. A control word is transmitted onto the channels 22 containing the address of the slave unit to be accessed, all as heretofore described. Upon receipt of the request pulse via channel 28 and the control word via channels 22, the appropriate slave unit recognized its address through its address comparator 40 to enable slave interface logic control 26' to impose an acknowledge signal onto line 30. As heretofore explained, the receipt of the acknowledge signal by the master interface control logic is indicative that the control word has been successfully received by the appropriate slave unit. Receipt of the acknowledge signal by the master unit removes the request pulse, thereby inhibiting the other slave units, as heretofore explained.

As heretofore explained, the control word includes a function code which includes (in the case of reading data from a memory), bit values indication of (1) a data operation, (2) an input to the master unit operation and (3) that the control word is operable on a memory. The command code in the control word dictates the type of data to be transmitted to the master unit. The slave unit responds to the function and command codes to formulate the data and insert it in data register 15'. (In the case of a memory fetch operation, the data word is fetched from the memory at the location dictated by the address of the control word. In the case of an input from an I/O channel, the I/O channel from which data is to be received is dictated by the channel data contained in the command code.) In either case, when the data word is placed in data register 15', transmitter 12' operates to place that data onto channels 22. Also, data register 15' provides an enable signal to slave interface control logic 15' causing a "resume" pulse signal to be impressed onto channel 32. The "resume" signal preferably is initiated before transmission of the data word, and in any case is terminated after termination of the data word by transmitter 12'.

Receipt of the "resume" signal by master interface logic 26 and the data word by the master receiver 14 is indicative that the data on channel 22 is the data requested by the master unit. The master interface control logic 26 provides an enable signal to hold register 17 to transfer the data received by receiver 14 and stored in register 17 to the central processor 24 for the next cycle.

Figure 4:
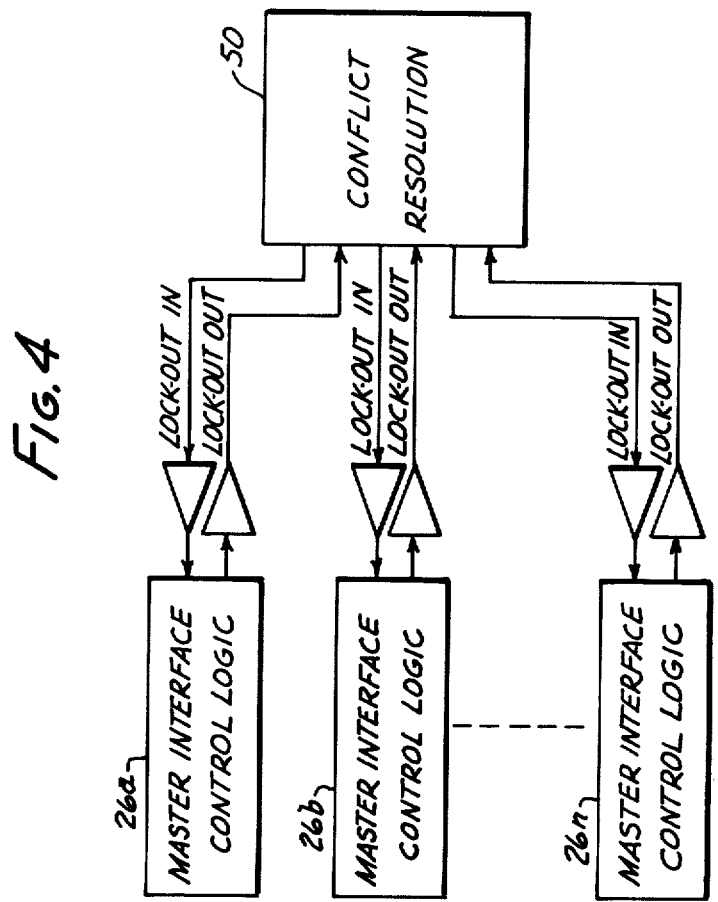
FIG. 4 is a block circuit diagram of a conflict resolution unit for use with the apparatus shown in FIGS. 1 and 1A.

With reference to FIg. 4, conflict resolution for access to the channel 22 by multiple master units may be explained. Of course, in computer configurations having only one master unit, the circuit illustrated in FIG. 4 is not necessary. Since slave units cannot seize channel 22 except upon request by the master unit, there can be no conflict in situations where there is only one master unit. With two or more master units, such as multiple central processors 24, a conflict resolution unit 50 is desired to avoid having conflicts arise between the master units. Upon initiation of an operation, and before the "request" pulse signal is generated by a master interface control logic 26a, the logic 26a forwards a lock-out signal to the conflict resolution unit 50. If no other master logics 26b . . . n have sought control of the channel, an enable signal is returned to the logic 26a permitting the logic 26a to initiate the "request" signal and operate its control and data registers as heretofore described. A subsequent lock-out signal from another logic 26b . . . n will not be responded to until clearing of the lock-out by completion of a "resume" pulse signal at the master interface control logic 26a which initiated the lock-out. If desired, in the case of three or more master units, priority between master units may be established by hardwire logic within conflict resolution unit 50. Otherwise, lock-outs and hence access to channel 22 may be delegated on a first in - first out basis by the conflict resolution unit.

The present invention thus provides a communication/multiplex interface unit between computer modules permitting configuration of a computer system for emulation purposes which operates at the data rate compatible with each module. The apparatus is efficient in operation and permits flexibility of system configurations.

This invention is not to be limited by the embodiment shown in the drawings and described in the description, which are given by way of example and not of limitation, but only in accordance with the scope of the appended claims.

What is claimed is:

1. In a computer system having a plurality of computer modules, at least one of which is a master module and at least some others of which are slave modules, a communication interface comprising, in combination: first data channel means having a plurality of parallel data channels for carrying binary information; first transmitter means associated with said master module for transmitting binary information, selected from the group consisting of control words and data words, from said master module onto said first data channel means; a plurality of second transmitter means associated with respective ones of said slave modules for transmitting binary data information onto said first data channel means; first receiver means associated with said master module for receiving binary data information from said first data channel means; a plurality of second receiver means associated with respective ones of said slave modules for receiving binary information from first said data channel means; second, third and fourth data channel means; first logic means associated with said master module and connected to said second, third and fourth data channel means; a plurality of second logic means associated with respective ones of said slave modules and connected to said second, third and fourth data channel means; said first logic means providing a pulse signal onto said second data channel means when said first transmitter means transmits a control word onto said first data channel means; address compare means associated with each of said slave modules and connected to the respective second receiver means for comparing at least a portion of a control word received by said respective second receiver means with a predetermined address; said second logic means being responsive to a compare signal from said address compare means and said pulse signal on said second data channel means for providing a pulse signal onto said third data channel means; said first logic means being responsive to said pulse signal on said third data channel to selectively either operate said first transmitter means to provide a data word onto said first data channel means or operate said first receiver means to read binary data information from said first data channel means; said second logic means providing a pulse signal onto said fourth data channel means in response to either operation of the respective second receiver means in receiving a data word on said first data channel means or operation of the respective second transmitter means in transmitting binary data information; said first logic means being responsive to said pulse signal on said fourth data channel means for selectively either indicating that said data word was successfully received by the respective slave module or for enabling said master module to accept binary data information from said first data channel means.

2. Apparatus according to claim 1 wherein said first logic means is further responsive to said pulse signal on said third data channel means for discontinuing said pulse signal on said second data channel means.

3. Apparatus according to claim 2 wherein said second logic means includes means for inhibiting response to a data word following a non-comparison between the address in the prior control word and the predetermined address.

4. Apparatus according to claim 3 wherein there are a plurality of master modules, said apparatus further including conflict resolution means responsive to a pulse signal on said second data channel means for inhibiting said first logic means from providing a pulse signal onto said second data channel means, said conflict resolution means being responsive to a pulse signal on said fourth data channel means to gate said first logic means to provide a pulse signal onto said second channel means when said first transmitter means transmits a control word onto said first channel means.

5. Apparatus according to claim 2 wherein there are a plurality of master modules, said apparatus further including conflict resolution means responsive to a pulse signal on said second data channel means for inhibiting said first logic means from providing a pulse signal onto said second data channel means, said conflict resolution means being responsive to a pulse signal on said fourth data channel means to gate said first logic means to provide a pulse signal onto said second channel means when said first transmitter means transmits a control word onto said first channel means.

6. Apparatus according to claim 1 wherein said second logic means includes means for inhibiting response to a data word following a non-comparison between the address in the prior control word and the predetermined address.

7. Apparatus according to claim 1 wherein there are a plurality of master modules, said apparatus further including conflict resolution means responsive to a pulse signal on said second data channel means for inhibiting said first logic means from providing a pulse signal onto said second data channel means, said conflict resolution means being responsive to a pulse signal on said fourth data channel means to gate said first logic means to provide a pulse signal onto said second channel means when said first transmitter means transmits a control word onto said first channel means.

8. Apparatus according to claim 5 wherein said second logic means includes means for inhibiting response to a data word following a non-comparison between the address in the prior control word and the predetermined address.

* * * * *